United States Patent
Espinosa et al.

(10) Patent No.: US 8,067,078 B1
(45) Date of Patent: Nov. 29, 2011

(54) NACRE COMPOSITES, METHODS OF SYNTHESIS, AND METHODS OF USE

(75) Inventors: Horacio Dante Espinosa, Winnetka, IL (US); François Barthelat, Montréal (CA)

(73) Assignee: Northwestern University, Evanston, IL (US)

( * ) Notice: Subject to any disclaimer, the term of this patent is extended or adjusted under 35 U.S.C. 154(b) by 721 days.

(21) Appl. No.: 11/985,115

(22) Filed: Nov. 13, 2007

Related U.S. Application Data

(60) Provisional application No. 60/858,577, filed on Nov. 13, 2006.

(51) Int. Cl.
*B32B 3/00* (2006.01)
(52) U.S. Cl. ............ 428/57; 106/638; 106/817; 428/53; 428/58
(58) Field of Classification Search .................... 428/57, 428/53, 58; 106/817, 638
See application file for complete search history.

(56) References Cited

U.S. PATENT DOCUMENTS

| | | | | |
|---|---|---|---|---|
| 5,755,787 | A * | 5/1998 | Camprasse et al. ........... | 424/423 |
| 6,264,740 | B1 * | 7/2001 | McNulty, Jr. ................. | 106/817 |
| 6,376,636 | B1 * | 4/2002 | Hansma et al. ................. | 528/32 |
| 2004/0034419 | A1 * | 2/2004 | Carter et al. ............... | 623/14.12 |
| 2005/0244239 | A1 * | 11/2005 | Shimp ........................... | 409/132 |

FOREIGN PATENT DOCUMENTS

GB          2107288 A  *  4/1983

OTHER PUBLICATIONS

W.J. Clegg et al., "A Simple Way to Make Tough Ceramics", Nature, 1990, pp. 455-457, vol. 347.
Zhiyong Tang et al., "Nanostructured Artificial Nacre", Nature Materials, 2003, pp. 413-418, vol. 2.
A. Sellinger et al., "Continuous Self-Assembly of Organic-Inorganic Nanocomposite Coatings that Mimic Nacre", Nature, 1998, pp. 256-260, vol. 394.
D.M. Dabbs and I. A. Aksay, "Self-Assembled Ceramics Produced by Complex-Fluid Templation", Annual Review of Physical Chemistry, 2000, pp. 601-622, vol. 51.
G. Mayer, "New Classes of Tough Composite Materials—Lessons from Natural Rigid Biological Systems", Materials Science and Engineering: C, 2006, pp. 1261-1268, vol. 26.
S. Deville et al., "Freezing as a Path to Build Complex Composites", Science, 2006, pp. 515-518, vol. 311.
W.D. Kingery et al. "Introduction to Ceramics", 2nd Ed., Chapter 14, pp. 704-767; 1960, 1976; John Wiley & Sons, New York.
University of Cambridge Department of Engineering Website (www-materials.eng.cam.ac.uk) Material Selection and Processing; Material Selection Chart: Strength—Elongation; 5 pp.
E. Munch et al. "Tough, Bio-Inspired Hybrid Materials" Science, 2008, pp. 1516-1520, vol. 322.

* cited by examiner

*Primary Examiner* — Brent O'Hern
(74) *Attorney, Agent, or Firm* — Bell & Associates; Matthew Kaser; Adam Warwick Bell

(57) ABSTRACT

The present invention relates to a novel composite structure with enhanced toughness, which incorporates features mimicked from nacre (mother of pearl). The structure can be used in many industrial and clinical applications, including aeronautics (aircraft skin), the defense industry (armor materials); orthopedics and medical devices (tough, biocompatible coatings on prostheses) and micro-electro-mechanical systems (MEMS; increased reliability for critical components).

24 Claims, 5 Drawing Sheets

NACRE COMPOSITES, METHODS OF SYNTHESIS, AND METHODS OF USE

The present application claims priority to U.S. Provisional Patent Application Ser. No. 60/858,577 entitled "Nacre Composite", filed Nov. 13, 2006, which is herein incorporated by reference in its entirety for all purposes.

This invention was made with government support under CMS-0301416 awarded by the National Science Foundation (United States). The United States government has certain rights in the invention.

TECHNICAL FIELD

The inventions relates to a novel composite material having superior toughness over similar materials that incorporates features mimicked from nacre (mother of pearl). In particular the invention relates nacre having a shape that is useful for combining multiple units of the shape that results in a rigid structure.

BACKGROUND ART

Nacre from the shells of bivalves, also known as mother-of-pearl, is about three thousand times tougher than the fragile ceramic it is made of (aragonite, 95% by volume). This improvement in toughness is the result of an extremely well designed structure arranged over several, distinct length scales (hierarchical structure). Microscopic aragonite tablets are arranged as overlapping layers similar to a three dimensional brick wall, and having a nanometers thick layer of soft organic material acting as a mortar (see FIGS. 1A and 1B). Ceramic materials, including aragonite, have many attractive engineering qualities such as stiffness, hardness, wear resistance, and resistance to high temperatures. The main obstacle to a wider use of ceramics in engineering applications is their brittleness: they fail at very small deformations and in a catastrophic fashion, and they are fragile in tension.

Several attempts at mimicking nacre have been made, but to this day none can reach the degree of toughness improvement of nacre (see Clegg, W. J., et al. (1990) Nature 347: 455-457; Tang, Z. Y., et al. (2003) Abst. Papers Am. Chem. Soc. 226; 413-418; Sellinger, A. et al. (1998) Nature 394: 256-260 (1998); Dabbs, D. M. and Aksay, I. A. (2000) Ann. Rev. Phys. Chem. 51: 601-622; Mayer, G. (2006) Mat. Sci. Eng. C—Biomimetics Supramol. Syst. 26: 1261-1268; and Deville, S., et al. (2006) Science 311: 515-518).

The prior art demonstrates that there is a current and long-felt need for an improved composite material having properties similar to natural nacre or mother-of-pearl. Such composites can have uses in aeronautics, defensive material, orthopedics, and MEMS (micro-electro-mechanical systems).

DISCLOSURE OF INVENTION

The invention provides a synthetic composite having a structure that is resilient to deformation and load stress. The synthetic composite can be used in the manufacture of tools, devices (including medical devices, surgical devices, and prosthetic devices), computer hardware, and materials that must resist extreme forces.

In one embodiment the invention provides a synthetic composite material capable of a deformation strain of at least 10%, the synthetic composite material comprising a plurality of interlocking ceramic tablets, wherein each ceramic tablet comprises at least 95% by volume of a ceramic material. In a preferred embodiment, the ceramic tablet has a unidirectional cross-section, the cross-section having two ends, and wherein the two ends comprise a dovetail shape. In another preferred embodiment, the ceramic tablet has a bi-directional cross-section comprising a quadrilateral shape. In an alternative preferred embodiment, the ceramic tablet has a bi-directional cross-section, each cross-section having two ends, and wherein the two ends comprise a dovetail shape. In another embodiment, the synthetic composite material has a tensile strain of at least 0.15. In a more preferred embodiment, in combination and under tensile force, the ceramic tablets are cohesive. In another more preferred embodiment, the ceramic tablets, under a tensile force, slide over one another at their respective interface. In another preferred embodiment the ceramic material comprises a compound selected from the group consisting of hydroxyapatite, tricalcium phosphate and other calcium phosphates, calcium-phosphorus compounds, hydroxyapatite calcium salts, inorganic bone, dental tooth enamel, aragonite, calcite, vaterite, nacre, graphite, pyrolytic carbon, BIOGLASS, bioceramic, dicalcium phosphate anhydrous (monetite, DCPA), graphite, and pyrolytic carbon. In a most preferred embodiment, the ceramic material comprises aragonite.

In another embodiment the synthetic composite material further comprises a binding material selected from the group consisting of, adhesives, glues, biological adhesives, fibrin glue, fibrinogen, thrombin, mussel adhesive protein, silk, elastin, collagen, casein, gelatin, albumin, keratin, chitin, chitosan, cyanoacrylates, epoxy-based compounds, dental resin sealants, bioactive glass ceramics (such as apatite-wollastonite), dental resin cements, glass ionomer cements, gelatin-resorcinol-formaldehyde glues, collagen-based glues, cellulosics, ethyl cellulose, SUPERGLUE, and UHU glue.

The invention also provides for a method for building a composite structure, the composite structure comprising a material capable of a deformation strain of at least 10%, the method comprising the steps of (i) providing a plurality of interlocking first ceramic tablets and second ceramic tablets, wherein each ceramic tablet comprises at least 95% by volume of a ceramic material, wherein the first ceramic tablet has a unidirectional cross-section, the cross-section having two ends, and wherein the two ends comprise a dovetail shape, and wherein the second ceramic tablet has a bi-directional cross-section comprising a quadrilateral shape; ii) layering the first tablets alternating with the second tablets in a first layer; (iii) layering the first tablets alternating with the second tablets in a second layer, the second layer above the first layer and in opposing sequence t the first layer; (iv) repeating steps (ii) and (iii) at least once; the method resulting in a composite structure, the composite structure comprising a material capable of a deformation strain of at least 10%. In a preferred embodiment, the first ceramic tablet has a bi-directional cross-section, each cross-section having two ends, and wherein the two ends comprise a dovetail shape. In another preferred embodiment, the synthetic composite material has a tensile strain of at least 0.15. In another preferred embodiment, in combination and under tensile force, the ceramic tablets are cohesive. In a still further preferred embodiment, the ceramic tablets, under a tensile force, slide over one another at their respective interface. In another preferred embodiment the ceramic material comprises a compound selected from the group consisting of hydroxyapatite, tricalcium phosphate and other calcium phosphates, calcium-phosphorus compounds, hydroxyapatite calcium salts, inorganic bone, dental tooth enamel, aragonite, calcite, vaterite, nacre, graphite, pyrolytic carbon, BIOGLASS, bioceramic, dicalcium phosphate anhydrous (monetite, DCPA), graphite, and pyrolytic carbon. In a most preferred embodiment, the ceramic material comprises aragonite.

In another embodiment the composite structure comprising further comprises a binding material selected from the group consisting of, adhesives, glues, biological adhesives, fibrin glue, fibrinogen, thrombin, mussel adhesive protein, silk, elastin, collagen, casein, gelatin, albumin, keratin, chitin, chitosan, cyanoacrylates, epoxy-based compounds, dental resin sealants, bioactive glass ceramics (such as apatite-wollastonite), dental resin cements, glass ionomer cements, gelatin-resorcinol-formaldehyde glues, collagen-based glues, cellulosics, ethyl cellulose, SUPERGLUE, and UHU glue.

DETAILED DESCRIPTION

Figure 1A:
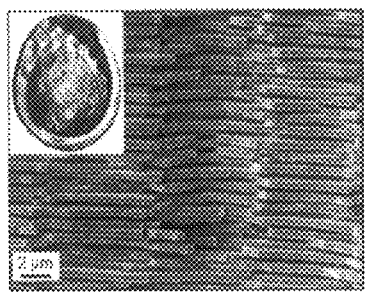
FIG. 1: (A) Electron microscope image of a fractured surface of red abalone nacre (inset: the actual shell); (B) Schematic of the brick and mortar structure of nacre, and deformation mechanisms; (C) Electron microscope image of a polished nacre sample, showing a dovetail-like geometry.
Figure 1B:
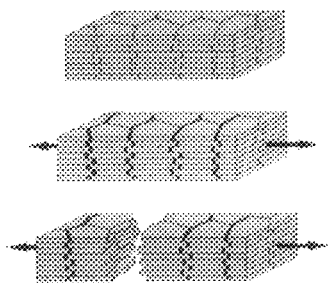
Figure 1C:
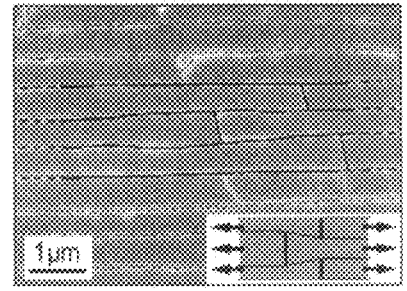

In natural nacre (mother-of-pearl) from bivalve shell, microscopic aragonite tablets are arranged as overlapping layers similar to a three dimensional brick wall, and having a nanometers thick layer of soft organic material acting as a mortar (see FIGS. 1A and 1B). Recently, the inventors have shown that some tablets have a dovetail geometry (FIG. 1C), which can provide progressive locking of the tablets together when the tablets are pulled apart.

In one aspect, the present invention refers to a novel composite design with enhanced toughness, which incorporates features mimicked from nacre. Ceramic materials have many attractive engineering qualities such as stiffness, hardness, wear resistance, and resistance to high temperatures. The main obstacle to a wider use of ceramics in engineering applications is their brittleness: they fail at very small deformations and in a catastrophic fashion, and they are fragile in tension.

The composite material disclosed here is made of 95% by volume or more of a ceramic material, yet it is capable of deformation strains in excess of 10%. In addition, the shape of the material is such that rather than failing at one location, stress and fracture are distributed over large volumes of material. This makes the material better at resisting, and even stopping cracks. This material retains the properties that make ceramics attractive, but it is at least ten times tougher than the composites of the prior art. Such material will become very attractive for a variety of applications.

Examples of compositions that can be used in the composite material include, but are not limited to, hydroxyapatite, tricalcium phosphate and other calcium phosphates, and calcium-phosphorus compounds, hydroxyapatite calcium salts, inorganic bone, dental tooth enamel, aragonite, calcite, vaterite, nacre, graphite, pyrolytic carbon, BIOGLASS, bioceramic, dicalcium phosphate anhydrous (monetite, DCPA), graphite, pyrolytic carbon, and mixtures thereof.

Figures 2A, 2B:
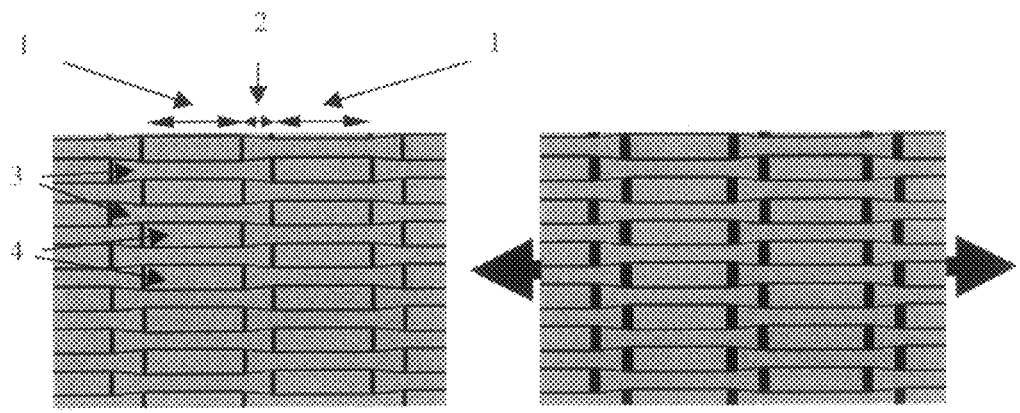
FIG. 2: (A) 2D depiction of the tablets' arrangement, showing interlocking dovetails. (B) Behavior when the composite is stretched along the tablets.

The new, artificial composite implements directly this dovetail feature within the microstructure (FIG. 2A). Tablets are stacked in columns. The tablets from the same column are stacked on the core regions (reference numeral 1; area indicated by bi-directional arrow), while the tablets from adjacent columns overlap in the overlap regions (reference numeral 2; area indicated by two-headed arrow). The major tablets (reference numeral 3) have dovetail features at their periphery, while the minor tablets (reference numeral 4) are smaller in diameter and flat. The tablets are held together by a binding material, such as, for example, but not limited to, glue, synthetic adhesives, biological adhesives, or metal. Suitable binding materials, adhesives, or glues include biological adhesives such as fibrin glue, fibrinogen, thrombin, mussel adhesive protein, silk, elastin, collagen, casein, gelatin, albumin, keratin, chitin or chitosan; cyanoacrylates; epoxy-based compounds; dental resin sealants; bioactive glass ceramics (such as apatite-wollastonite), dental resin cements; glass ionomer cements (such as IONOCAP and INOCEM available from Ionos Medizinische Produkte GmbH, Greisberg, Germany); gelatin-resorcinol-formaldehyde glues; collagen-based glues; cellulosics such as ethyl cellulose; and adhesives such as SUPERGLUE and UHU glue.

As illustrated in FIG. 2B, when a tensile load is applied along the direction of the tablets (heavy arrows), the tablets start sliding upon one another between the dovetail shaped ends within the overlap regions. Because of the dovetail geometry at these regions, it becomes more and more difficult to slide tablets against one another, so that other sliding sites appear, thus spreading deformation over large volumes. Note that the sliding may be controlled by, for example, a resilient adhesive or glue or by solid friction. The dovetail geometry is such that the locking is strong enough to resist sliding, but not too strong so that the tablets do not break before sliding.

Figure 3:
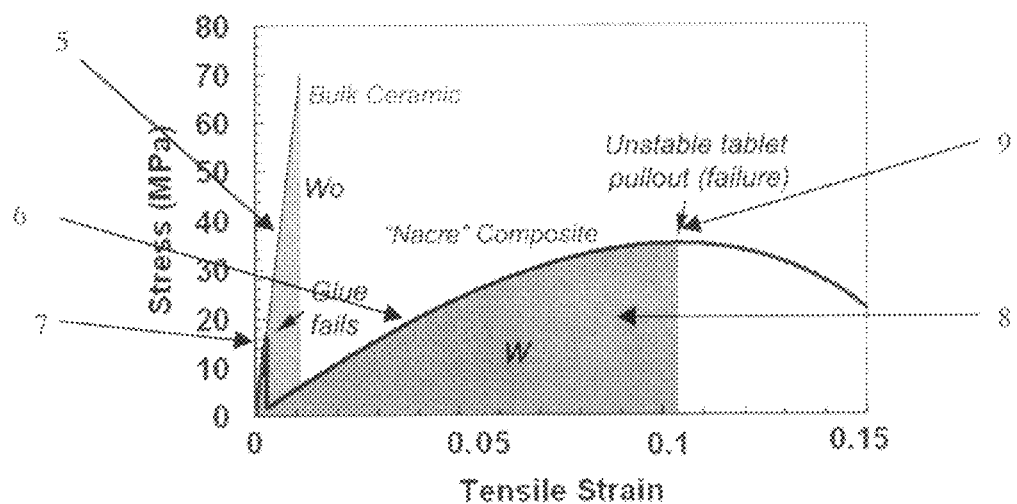
FIG. 3: Predicted stress-strain curves for bulk ceramic (prior art) and nacre composite.

The resulting tensile stress-strain curve is showed on FIG. 3. In this example, stress=force/cross-sectional area when the material is pulled, strain=extension/initial length when the material is pulled. The response of the bulk ceramic the composite is made (control) of is also shown (reference numeral 5). Initially, the linear elastic response of the bulk ceramic (reference numeral 5) and composites (reference numeral 6) are the same. At small stresses (in this case at 15 Mpa), the glue fails (reference numeral 7) at the interface in the overlap regions. Then the tablets start to slide on one another, in the overlap region. The resulting separation between the tablets generates the large strains shown on the stress-strain curve (reference numeral 8). While the tablets are pulled out from each other the resistance tends to increases because of the progressive locking, but this effect is balanced by the decrease of contact area, which decreases the resistance. When the contact area becomes too small the material becomes unstable (in this case at a strain of 0.1) and the material fails (reference numeral 9). In term of mechanical performance, the composite is softer than the ceramic; its strength is about half of the ceramic, but the energy absorbed (FIG. 3; toughness W) is five to ten times that of the bulk ceramic (FIG. 3; $W_O$).

Figure 4A:
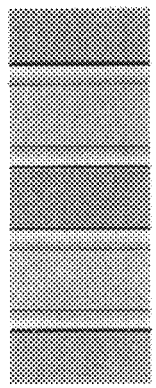
FIG. 4. Unidirectional structure of the composite. (A) Perspective from above; (B) Three-dimensional perspective. The arrow indicates the effective tensile direction.
Figure 4B:
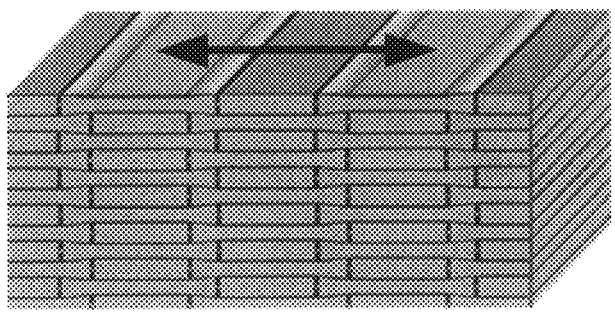
Figure 5A:
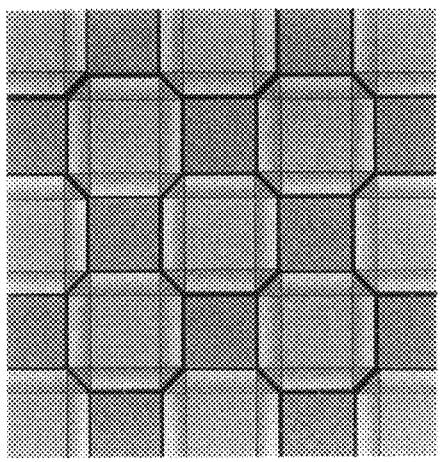
FIG. 5. Bi-directional structure of the composite. Left: perspective from above, Right: three-dimensional perspective.
Figure 5B:
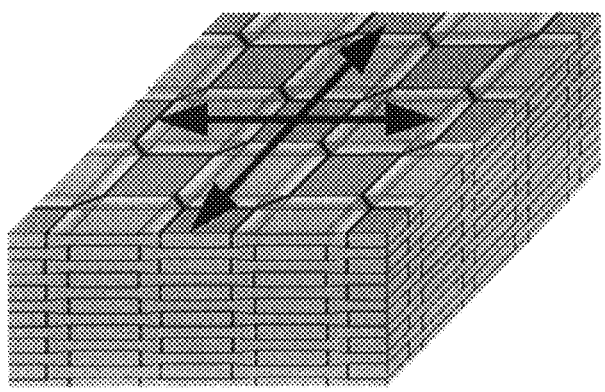

Two structures of the composite are disclosed herein, although one of skill in the art will understand that many other structures are possible. In this case, exemplary structures are a unidirectional structure and the bi-directional structure. The unidirectional structure is showed in FIG. 4. FIG. 4A illustrates the stack of tablets in an end perspective. FIG. 4B illustrates a stack of tablets in three-quarter perspective. It is designed to resist tension and to absorb energy in only one dimension (the dimension shown as a single two-headed arrow on FIG. 4B). The bi-directional structure is show on FIG. 5. FIG. 5A illustrates the stack of tablets in an end perspective. FIG. 5B illustrates a stack of tablets in three-quarter perspective. This structure is designed to absorb energy in, for example, two dimensions (FIG. 5B; two-headed arrows on perpendicular planes). Its structure is shaped and adapted so that the locking structure can operate in two dimensions, as shown by the pair of two-headed arrows perpendicular to one another.

Exemplary properties of the tablets that allow the sliding and stiffening behaviors between the tablet structures is a fine-tuning of the tablet's geometry and arrangements between the individual tablets. There now follows an exemplary disclosure of the mathematical relationships that can be used to define the structures.

Of particular note the invention provides technologies and structures having a dovetail geometry at the edges of the tablets; structures having progressive locking mechanism, hardening and spreading of deformation; a three dimensional staggered arrangement of the composite inclusions, or tablets; and design guidelines to achieve this composite.

The behavior of the microstructure of the composite can be represented by a periodic-symmetric representative volume element (RVE) showed on FIG. 6.

Design and Manufacture
Boundary Conditions

Figure 6A:
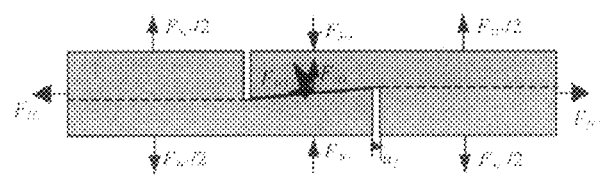
FIG. 6. Representative volume element of the nacre composite. (A) Forces on the RVE; (B) Stresses and dimensions.
Figure 6B:
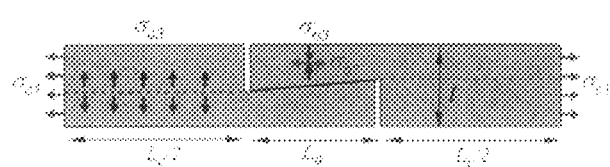

Only uniaxial tension is considered on the RVE, and therefore the average shear strain on the RVE was set to zero. The periodic boundary conditions on the RVE are then written:

$$u_x(Lo+Lc,z)=u_x(-(Lo+Lc),z)+2(Lo+Lc)\cdot\bar{\epsilon}_x \ \forall z\in[-t,t] \quad (1)$$

$$u_z(x,t)=u_z(x,-t)+2t\bar{\epsilon}_z, \ \forall x\in[-(Lo+Lc),Lo+Lc] \quad (2)$$

Where $\bar{\epsilon}_x$ and $\bar{\epsilon}_z$ are the average strains over the RVE. In addition, the RVE is symmetric about the x=0 and z=0 axes, so that only a quarter of the RVE needs to be modeled (FIGS. 6A and 6B). The displacement must also satisfy symmetry:

$$\begin{cases} u_x(0, z) = 0 \\ u_x(x, z) = -u_x(-x, z) \\ u_z(x, z) = u_z(-x, z) \end{cases} \quad (3)$$

and $$\begin{cases} u_z(x, 0) = 0 \\ u_x(x, z) = u_x(x, -z) \\ u_z(x, z) = -u_z(x, -z) \end{cases} \quad (4)$$

Combining (1) and (3) yields the periodic-symmetric condition on the reduced RVE:

$$\begin{cases} u_x(0, z) = 0 \\ u_x(Lo + Lc, z) = (Lo + Lc)\cdot\bar{\epsilon}_x \end{cases} \forall z \in [0, t] \quad (5)$$

Similarly, combining (2) and (4) yields:

$$\begin{cases} u_z(x, 0) = 0 \\ u_z(x, t) = t\cdot\bar{\epsilon}_z \end{cases} \forall x \in [0, Lo + Lc] \quad (6)$$

The RVE is stretched along the direction of the tablets. This is easily achieved by imposing a uniform displacement on the right hand side boundary, by satisfying (5). Due to Poisson's effect and other mechanisms described below, the RVE may expand or contract in the transverse direction. By doing so however, the displacement must be uniform on the top boundary as imposed by equation (6).

Tablet Elasticity

In this highly simplified analytical model, the stresses and strains are assumed to be uniform in the core region, as well as in the overlap region (although they might be different). The elasticity in the tablets is governed by Hooke's law, which in plane strain yields for the core region:

$$\varepsilon c_z = \frac{1-v^2}{E}\sigma c_z - \frac{v(1+v)}{E}\sigma c_x \quad (7)$$

and for the overlap area:

$$\varepsilon o_z = \frac{1-v^2}{E}\sigma o_z - \frac{v(1+v)}{E}\sigma o_x \quad (8)$$

RVE Stresses

The tensile stress applied on the RVE is directly transmitted to the core region:

$$\bar{\sigma}_x = \sigma c_x \quad (9)$$

where $\bar{\sigma}_x$ is the average RVE stress that characterizes the macroscopic response of the composite structure. The load carrying section of the tablets in the overlap region is about half of that in the core region, so that:

$$\sigma o_x = 2\sigma c_x \quad (10)$$

In addition, the model is in uniaxial tension and the average stress in the z direction must be zero:

$$\sigma o_z(L_O - u_S) + L_C \sigma c_z = 0 \quad (11)$$

Equation (11) couples the transverse stress in the overlap and core regions. As the locking amplifies, the transverse compressive stress builds up in the core region. This compressive stress must be balanced by a tensile stress in the core region.

RVE Strains

In this simplified model, the RVE (macroscopic) strains are assumed to be dominated by tablets sliding (that is, the elastic deformation of the tablets is neglected). The RVE strain is then written:

$$\bar{\varepsilon}_x = \frac{u_s}{L_c + L_o} \qquad (12)$$

Load Transfer at the Interface

Figure 7:
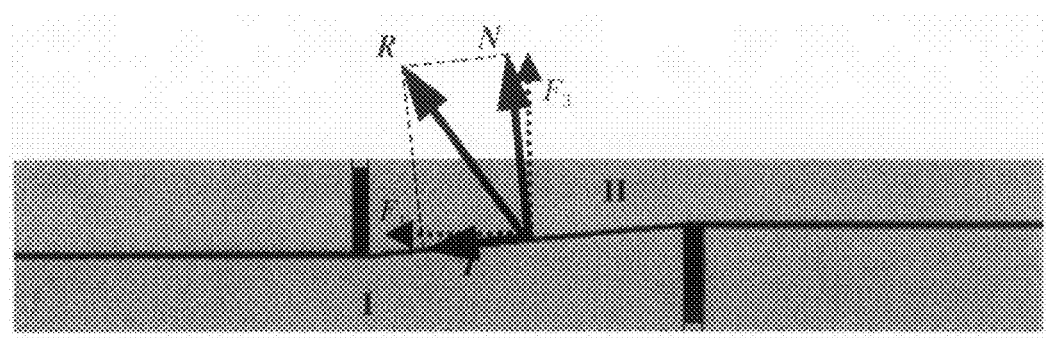
FIG. 7: Diagram of the contact forces involved in tablet sliding.

Upon failure of the interface in the overlap region, the load is transferred through sliding and friction of the tablets in the overlap region. The forces involved in the contact between sliding tablets in the overlap regions are showed on FIG. 7. The reaction force R exerted by tablet I on tablet II comprises normal force N and tangential force T. The two components are linked through Coulomb's law:

$$T = fN \qquad (13)$$

$F_x$ and $F_z$ are the projected reaction forces on the longitudinal and transverse direction respectively. They are given by:

$$F_x = N \sin\theta + T \cos\theta \qquad (14)$$

$$F_z = N \cos\theta - T \sin\theta \qquad (15)$$

Within the small angle approximation for è, (8) and (9) become:

$$F_x \approx N\theta + T \qquad (16)$$

$$F_z \approx N - T\theta \qquad (17)$$

These contact forces can be connected to the stresses in the overlap region via:

$$F_x \approx \frac{1}{2}\sigma o_x \qquad (18)$$

and $$F_z = -(L_O - u_s)\sigma o_z \qquad (19)$$

Note that $F_x$ induces a tensile (positive) stress along the x direction, while $F_z$ induces a compressive (negative) stress along the z direction.

Combining equations (13), (16) and (17) yields:

$$\frac{F_z}{F_x} = \frac{1 - f\theta}{\theta + f} \qquad (20)$$

Combining (20) with (18) and (19) yields:

$$\frac{\sigma o_z}{\sigma o_x} = \frac{-t(1 - f\theta)}{2(L_o - u_s)(\theta + f)} \qquad (21)$$

Equation (21) captures the load transfer at the interface and couples the axial and transverse stresses in the overlap region. As the tensile axial stress increases, the locking due to the dovetail geometry amplifies, and the compressive transverse stress increases.

Kinematics at the Interface

The geometry of the dovetail is such that sliding the tablets in the overlap region generates expansion the z direction. This expansion is combined with the strains in the tablets to generate the transverse displacement $$u_z(x,t) = t\epsilon o_z + u_S \tan\theta \qquad (22)$$

and for small è

$$u_z(x,t) = t\epsilon o_z + u_S \theta \qquad (23)$$

Because of the symmetric-periodic conditions, the expansion along z must be the uniform on the upper boundary (z=t) of the RVE, so that:

$$\varepsilon c_z = \varepsilon o_z + \frac{u_s}{t}\theta \qquad (24)$$

RVE Mechanical Response

Equations (7) though (12), (21) and (24) are combined to form the RVE stress-strain response to uniaxial tension along the tablets, as function of the tablet properties and of the microstructural parameters, $$\frac{\sigma_x}{E} = \frac{(\tilde{L}o + \tilde{L}c)\theta\bar{\varepsilon}_x}{(1 - v^2)\left(\frac{1}{(\tilde{L}o - (\tilde{L}o + \tilde{L}c)\bar{\varepsilon}_x)} + \frac{1}{\tilde{L}_c}\right)\frac{1 - f\theta}{\theta + f} + v(1 + v)} \qquad (25)$$

with the non-dimensional microstructural parameters $\tilde{L}o = Lo/t$, $\tilde{L}c = Lc/t$. Note that even though some of the processes in the RVE are nonlinear, the stresses are controlled by elasticity in the tablets, and they are therefore proportional to the modulus. As the sliding increases the locking amplifies and the stress increases. Increasing the sliding of the tablets also decreases the contact area and the intensity of the locking. The two effects are competing, and the stress reaches a maximum at a strain:

$$\bar{\varepsilon}_x |_{max} = \frac{1}{\tilde{L}o + \tilde{L}c}\left(\tilde{L}o + \frac{1 - \sqrt{(1 + A\tilde{L}o)}}{A}\right) \qquad (26)$$

with $$A = \frac{1}{\tilde{L}_c} + \frac{v}{(1 - v)}\frac{\theta + f}{1 - f\theta} \qquad (27)$$

Following the maximum stress the structure softens and becomes unstable. Note that for the case è=0 (no dovetail), no locking is possible, the stress is uniformly null and the material does not have any cohesion.

It is also useful to write the tensile stress building up in the core region along the z direction:

$$\frac{\sigma c_z}{E} = \frac{(1 - f\theta)}{\tilde{L}_c(\theta + f)}\frac{\bar{\sigma}_x}{E} \qquad (28)$$

The analytical expression presented above can now be used to design the microstructure so that the composite duplicates the deformation mode of nacre. Considering the structure and loading conditions, four possible failure modes were identified:

i) Premature tablet failure in tension, before sliding starts.
ii) The tablets start sliding and the structure hardens, but the tablets fail in tension before the maximum predicted stress was reached.
iii) The tablets start sliding, but the core of the tablets delaminates due to excessive transverse tension.
iv) The tablets start sliding, until failure by tablet pullout.

Clearly, the first three failure modes lead to premature failure and are deleterious to the performance of the composite. The fourth mode—failure by tablet pullout—is the failure mode of nacre in tension, and is desirable to optimize the performance of the present structure. Tailoring the microstructural parameters as function of material properties ensures that the structure fails by tablet pullout.

Overlap Length

In order to prevent the premature failure of the tablets (first failure mode), the interface in the overall regions must fail in shear before the tensile strength of the tablets is reached. By neglecting the effect of the dovetail angle, this condition can be written as:

$$2L o \tau_I < t \sigma_T \quad (29)$$

$$\tilde{L}o < \frac{1}{2}\frac{\sigma_T}{\tau_I} \quad (30)$$

or where $\sigma_T$ is the tensile strength of the tablets and $\tau_I$ is the shear strength of the adhesive bonding at the interfaces.

Once sliding starts, the tablet must slide and reach the predicted maximum stress without failing in tension (failure mode ii) or delaminating (failure mode iii). These conditions can be written as:

$$\bar{\sigma}_{max} < \frac{1}{2}\sigma_T \quad (32)$$

and $$\sigma c_{z\,max} < \sigma_I \quad (33)$$

where $\sigma_I$ is the tensile strength of the adhesive bonding between the tablets.

Figure 8:
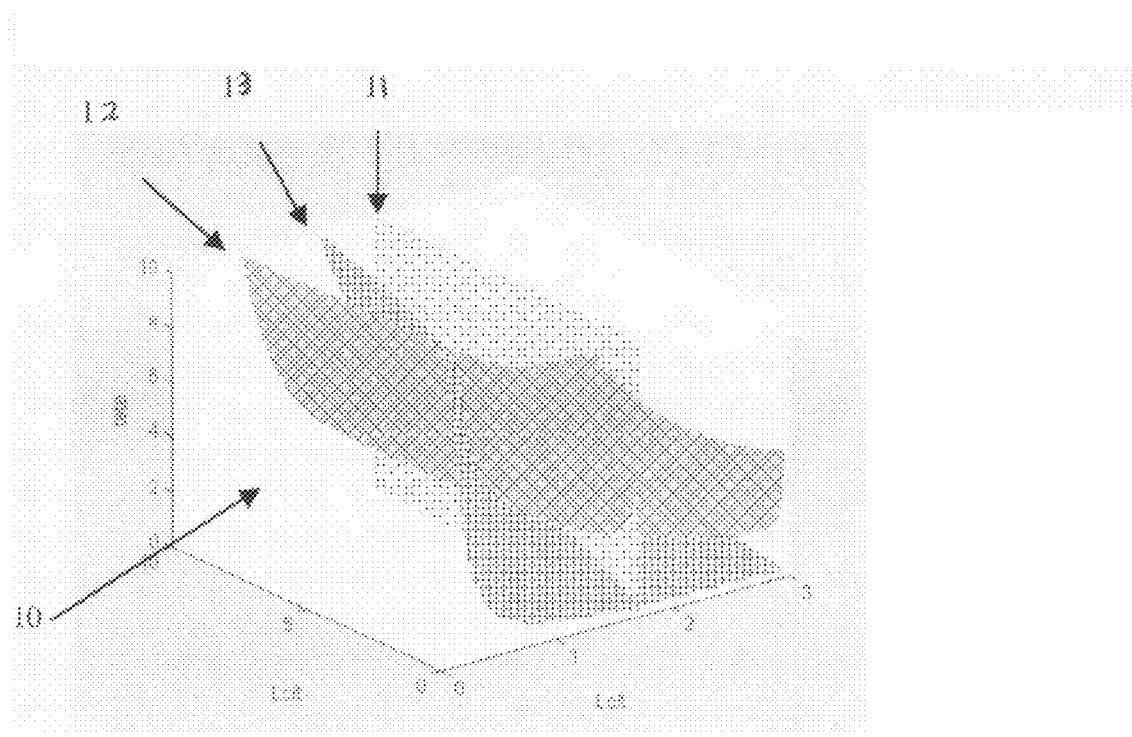
FIG. 8: Design space for the nacre composite.

The constraints (30), (31) and (32) can be visualized in the design space $(\tilde{L}o, \tilde{L}c, \grave{e})$ as shown in FIG. 8. The dimensions of the microstructure must be chosen within the white space (volume delimited by the planes defined by equations (34), (35), and (36); reference numeral 10) to make sure the composite fails properly.

In can be shown using the analytical model for the structure that maximizing $\tilde{L}o$, $\bar{\sigma}_{max}$ and $\sigma c_{3\,max}$ is equivalent to maximizing the energy absorbed by the structure (toughness). By using a safety factor k (k>1), one can determine the optimum structure that satisfies:

$$\tilde{L}o = \frac{1}{2k}\frac{\sigma_T}{\tau_I} \quad (34)$$

$$\bar{\sigma}_{max} = \frac{2}{k}\sigma_T \quad (35)$$

$$\sigma c_{z\,max} = \frac{1}{k}\sigma_I \quad (36)$$

$\tilde{L}o$ is directly determined by (34), while the two other microstructural parameters $\tilde{L}c$ and $\grave{e}$ are obtained by using (25) through (28) and by numerically solving the system of equation (35) and (36).

These equations thus provide a design guideline for the nacre composite. Given a set of materials for the tablets and interfaces, the optimum microstructure can be determined.

REFERENCE NUMERALS

1. Core region
2. Overlap region
3. Major tablet
4. Minor tablet
5. Bulk ceramic; control composition
6. Nacre composite of the invention
7. Glue fails in composite
8. Predicted strain achievable
9. Predicted failure point
10. Theoretical volume defined by equations (34), (35), and (36)
11. Equation No. 34
12. Equation No. 35
13. Equation No. 36

The invention will be more readily understood by reference to the following examples, which are included merely for purposes of illustration of certain aspects and embodiments of the present invention and not as limitations.

EXAMPLES

Example I

Manufacture of Nacre Composite using Stereolithography Stereolithography

Sterolithography is a 3D manufacturing process using photo-polymerization. Illuminating UV radiation over a light-curable resin surface induces photo-polymerization, constructing a solid microstructure. The photo-curable resin is a liquid mixture of the photo-initiator and the monomers—under UV light, the photo initiator absorbs the incident photons and generates radicals that react with the monomers to form reactive molecules. The reactive monomers then form polymer chains, which in turn cross-link to form a solid polymer structure.

Figure 9:
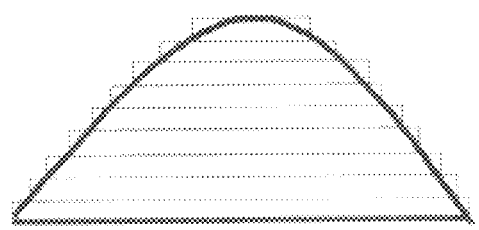
FIG. 9. Stair-stepping effect on curved surfaces due to the layer-by-layer fabrication.

The 3D structure is fabricated in a layer-by-layer fashion by slicing the CAD model into a series of closely spaced horizontal layers. The structure is built on a substrate that is placed on a translational stage and immersed in the liquid resin one layer thickness deep. Each layer is exposed and cured in a separate step—after the fabrication of one layer, the substrate is immersed another layer thickness into the resin and the new layer is fabricated on top of the existing structure. Geometrically complex microstructures can be fabricated in this way by building the layers sequentially and stacking them from bottom to top. Although the stair-stepping effect causes roughness on curved surfaces (FIG. 9), this can be reduced by decreasing the layer thickness.

Figure 10:
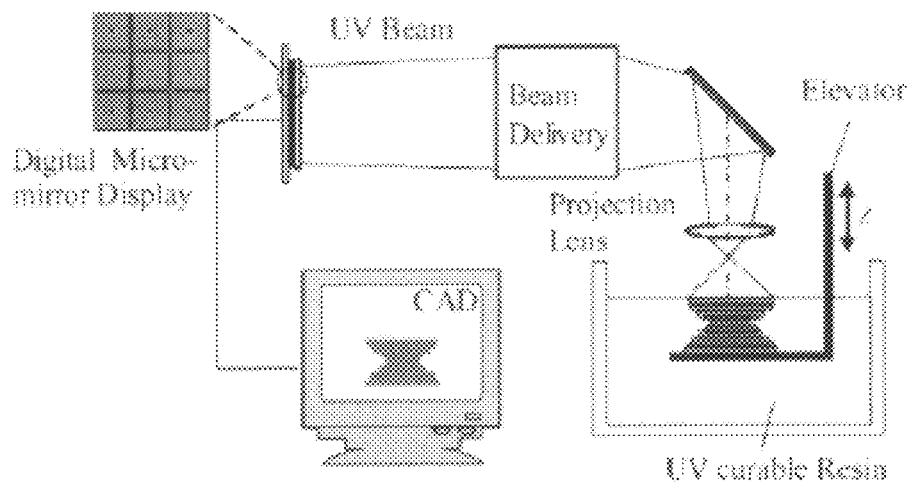
FIG. 10. Schematic diagram of projection micro-stereolithography (PµSL) apparatus.

FIG. 10 shows a schematic diagram of a stereolithography apparatus, used for a high resolution micro-stereolithography utilizing a tightly focused light spot and a Digital Micromirror Device (DMD) chip as a dynamic mask generator (C. Sun, N. Fang, D. M. Wu, X. Zhang, Sens. Actuat., A 121: 113 (2005)).

Micro-stereolithography uses the same principles as regular stereolithography, but offers a higher resolution in the micrometer range. The minimum feature size is about 15-30 µm, and the minimum layer thickness about 1-10 µm.

There are a variety of commercial UV curable resins that are optimized for stereolithography, and a partial list and their reported mechanical properties are listed in Table 1. The material and mechanical properties of the structure manufactured by stereolithography can be tailored by controlling the type of resin, ratio of photo-initiator to monomer in the resin, exposure and curing time. In addition, adding UV absorbers to the resin allows the curing depth to be adjusted.

Stereolithography is not limited to polymeric materials only—ceramic and metallic structures have been successfully fabricated by mixing UV curable resin with fine powders (X. Zhang, X. N. Jiang, C. Sun, Sens. Actuat., A 77: 149 (1999); X. N. Jiang, C. Sun, X. Zhang, B. Xu, Y. H. Ye, Sens. Actuat., A 87 72 (2000).

TABLE 1

Commercially available UV curable resins and their mechanical properties.

| Name | Somos WaterShed 11120 | Somos White 14120 | Accura 60 (transparent) | Accura 25 (white) |
|---|---|---|---|---|
| Elastic modulus (GPa) | 2.65-2.88 | 2.46 | 2.7-3.1 | 1590-1660 |
| Poisson's ratio | ? | 0.23 | ? | ? |
| Friction coefficient | ? | ? | ? | ? |
| Elongation at break | 11-20% | 8% | 5-13% | 13-20% |
| Tensile strength (MPa) | 47-54 | 46 | 58-68 | 38 |

Fabrication of Nacre Composite

Figure 11:
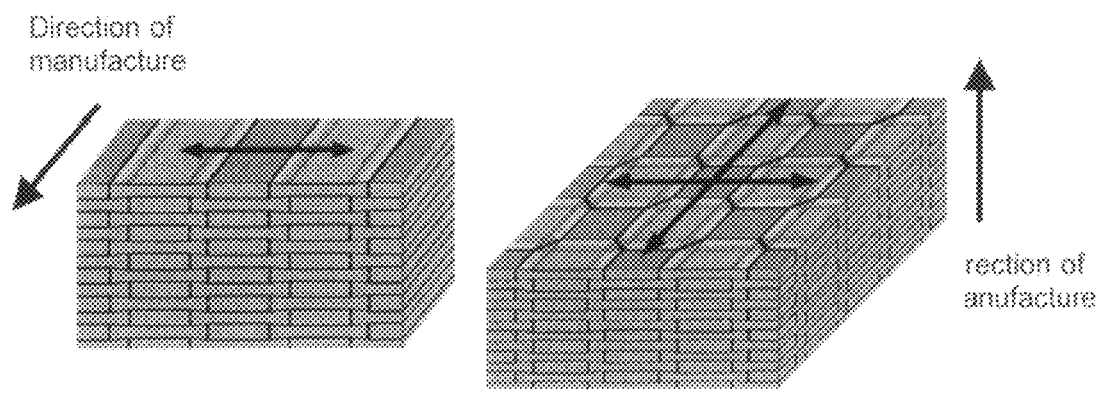
FIG. 11. Preferred directions of manufacture for the two structures of nacre composite.

The nacre composite structures of FIGS. 4 and 5 are manufactured using micro-stereolithography utilizing the procedure of layer-by-layer fabrication described above. The preferred directions of advance of layers for the unidirectional and bidirectional structures are indicated in FIG. 11. The inclination of the edges of the major tablets and the gap between the tablets are the smallest features of the microstructure and need to be carefully and accurately controlled.

The stereolithography process manufactures the tablets of the artificial nacre composite from the chosen resin. The interface material needs to be infused into the gaps between the tablets in order to complete the composite structure. This is chosen to be an adhesive which is infiltrated into the gaps in the liquid state and then cured.

The dimensions of the microstructure and the overall size of the composite is determined by considering the design guidelines for the composite to ensure the proper failure mode (equations (34), (35, and (36)) along with the material parameters of the composite. The smallest feature in the microstructure is the gap between tablets, $u_I$ in FIG. 6. To ensure smoothness and accuracy of the microstructure, $u_I$ will be chosen to be larger than the minimum feature size of the specific stereolithography system.

Figure 12:
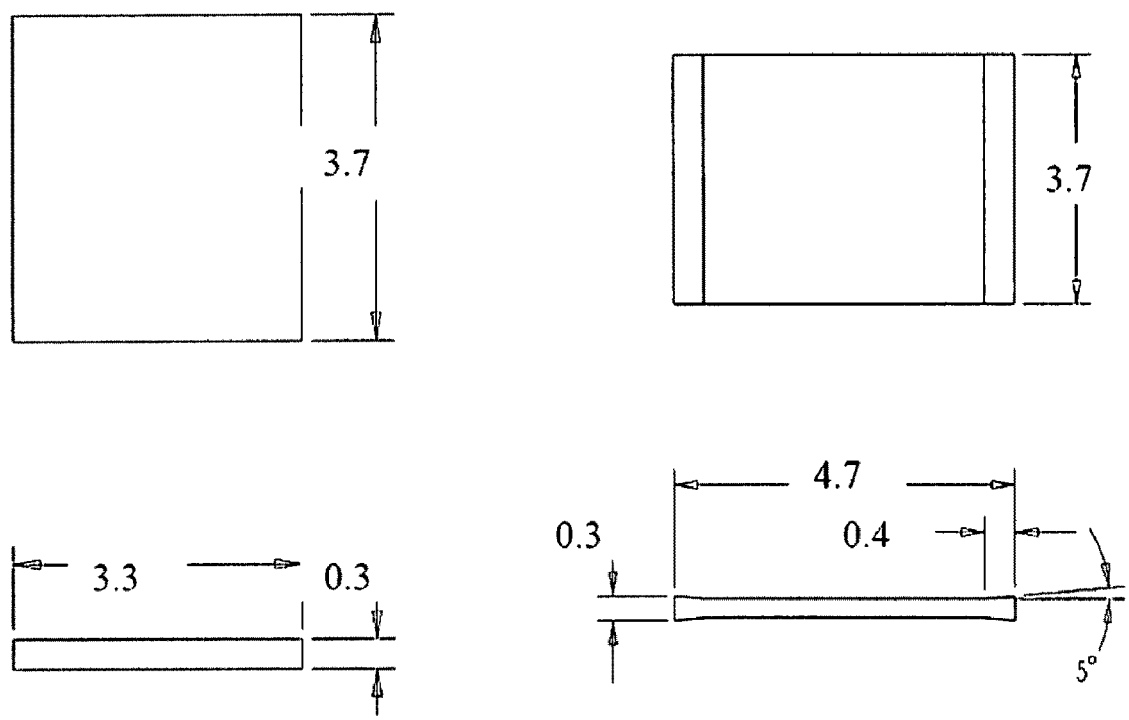
FIG. 12. Dimensions of the (A,C) minor and (B,D) major tablets, dimensions are in millimeters.

For example, one possible nacre composite using Accura 60 (see Table 1) will have dimensions given in FIG. 12 for the minor and major tablets, for a stereolithography system with a minimum feature size of 0.13 mm, and minimum layer thickness of 50 µm. The gaps between the tablets will be 70-100 nm, and the overall composite dimension will be on the order of 10-100 mm. However, by selecting different materials and using stereolithography systems with different spatial resolutions, it will be possible to fabricate composites with various dimensions in accordance with the requirements of the particular applications.

Those skilled in the art will appreciate that various adaptations and modifications of the just-described embodiments can be configured without departing from the scope and spirit of the invention. Other suitable techniques and methods known in the art can be applied in numerous specific modalities by one skilled in the art and in light of the description of the present invention described herein. Therefore, it is to be understood that the invention can be practiced other than as specifically described herein. The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

We claim:

1. A synthetic deformation resilient composite material capable of a deformation failure strain of at least 5%, the synthetic deformation resilient composite material comprising a plurality of interlocking ceramic tablets, wherein each ceramic tablet comprises at least 85% by volume of a ceramic material, and wherein the interlocking ceramic tablets further comprise a core area, an overlap area, and a load carrying section of the overlap area, and wherein the load carrying section of the overlap area is about half that of a load carrying section in the core area.

2. The synthetic deformation resilient composite material of claim 1 wherein the ceramic tablet has a unidirectional cross-section, the cross-section having two ends, and wherein the two ends comprise a dovetail shape.

3. The synthetic deformation resilient composite material of claim 1 wherein the ceramic tablet has a bi-directional cross-section comprising a quadrilateral shape.

4. The synthetic deformation resilient composite material of claim 1 wherein the ceramic tablet has a bi-directional cross-section, each cross-section having two ends, and wherein the two ends comprise a dovetail shape.

5. The synthetic deformation resilient composite material of claim 1 wherein the synthetic deformation resilient composite material has a tensile strain of at least 0.05.

6. The synthetic deformation resilient composite material of claim 1 wherein, in combination and under tensile force, the ceramic tablets are cohesive.

7. The synthetic deformation resilient composite material of claim 1 wherein the ceramic tablets, under a tensile force, slide over one another at their respective interface.

8. The synthetic deformation resilient composite material of claim 1 wherein the ceramic material comprises a compound selected from the group consisting of hydroxyapatite, tricalcium phosphate and other calcium phosphates, calcium-phosphorus compounds, hydroxyapatite calcium salts, inorganic bone, dental tooth enamel, aragonite, calcite, vaterite, nacre, graphite, pyrolytic carbon, bioactive glass ceramic, bioceramic, dicalcium phosphate anhydrous (monetite, DCPA), graphite, and pyrolytic carbon.

9. The synthetic deformation resilient composite material of claim 8 wherein the ceramic material comprises aragonite.

10. The synthetic deformation resilient composite material of claim 1, further comprising a binding material selected from the group consisting of, adhesives, glues, biological adhesives, fibrin glue, fibrinogen, thrombin, mussel adhesive protein, silk, elastin, collagen, casein, gelatin, albumin, keratin, chitin, chitosan, cyanoacrylates, epoxy-based compounds, dental resin sealants, bioactive glass ceramics (such as apatite-wollastonite), dental resin cements, glass ionomer cements, gelatin-resorcinol-formaldehyde glues, collagen-based glues, cellulosics, and ethyl cellulose.

11. The synthetic deformation resilient composite material of claim 1, wherein the synthetic deformation resilient composite material is capable of a deformation failure strain of at least 7.5%.

12. The synthetic deformation resilient composite material of claim 11, wherein the synthetic deformation resilient composite material is capable of a deformation failure strain of at least 10%.

13. The synthetic deformation resilient composite material of claim 1, wherein each ceramic tablet comprises at least 89% by volume of a ceramic material.

14. The synthetic deformation resilient composite material of claim 13, wherein each ceramic tablet comprises at least 95% by volume of a ceramic material.

15. The synthetic deformation resilient composite material of claim 5, wherein the synthetic deformation resilient composite material has a tensile strain of at least 0.06.

16. The synthetic deformation resilient composite material of claim 15, wherein the synthetic deformation resilient composite material has a tensile strain of at least 0.07.

17. The synthetic deformation resilient composite material of claim 16, wherein the synthetic deformation resilient composite material has a tensile strain of at least 0.08.

18. The synthetic deformation resilient composite material of claim 17, wherein the synthetic deformation resilient composite material has a tensile strain of at least 0.09.

19. The synthetic deformation resilient composite material of claim 18, wherein the synthetic deformation resilient composite material has a tensile strain of at least 0.10.

20. The synthetic deformation resilient composite material of claim 19, wherein the synthetic deformation resilient composite material has a tensile strain of at least 0.11.

21. The synthetic deformation resilient composite material of claim 20, wherein the synthetic deformation resilient composite material has a tensile strain of at least 0.12.

22. The synthetic deformation resilient composite material of claim 21, wherein the synthetic deformation resilient composite material has a tensile strain of at least 0.13.

23. The synthetic deformation resilient composite material of claim 22, wherein the synthetic deformation resilient composite material has a tensile strain of at least 0.14.

24. The synthetic deformation resilient composite material of claim 23, wherein the synthetic deformation resilient composite material has a tensile strain of at least 0.15.

* * * * *